Jan. 29, 1946.　　A. A. COLLINS　　2,393,856
CALIBRATION SYSTEM FOR RADIO RECEIVERS
Filed Oct. 12, 1944　　2 Sheets-Sheet 2
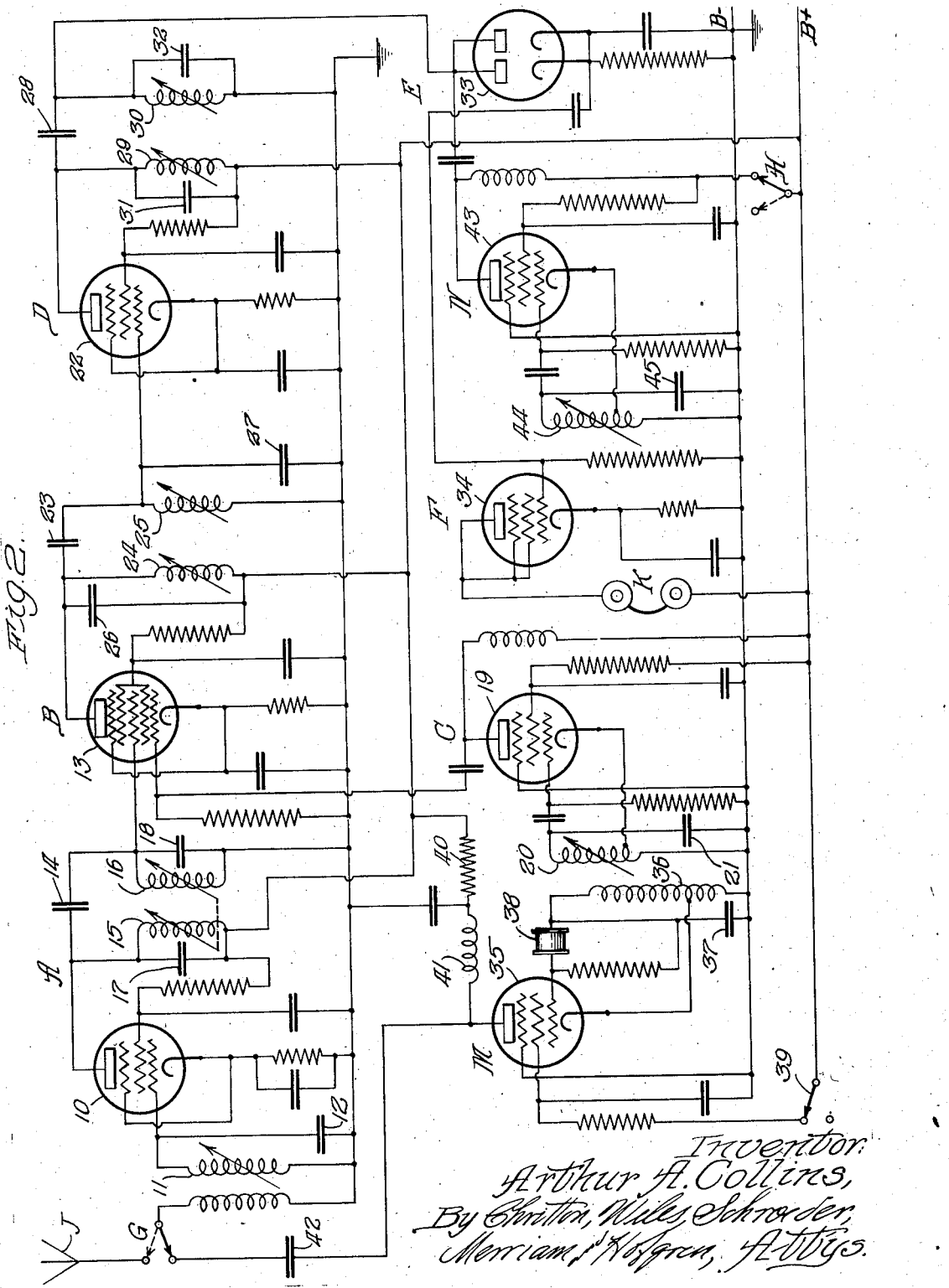

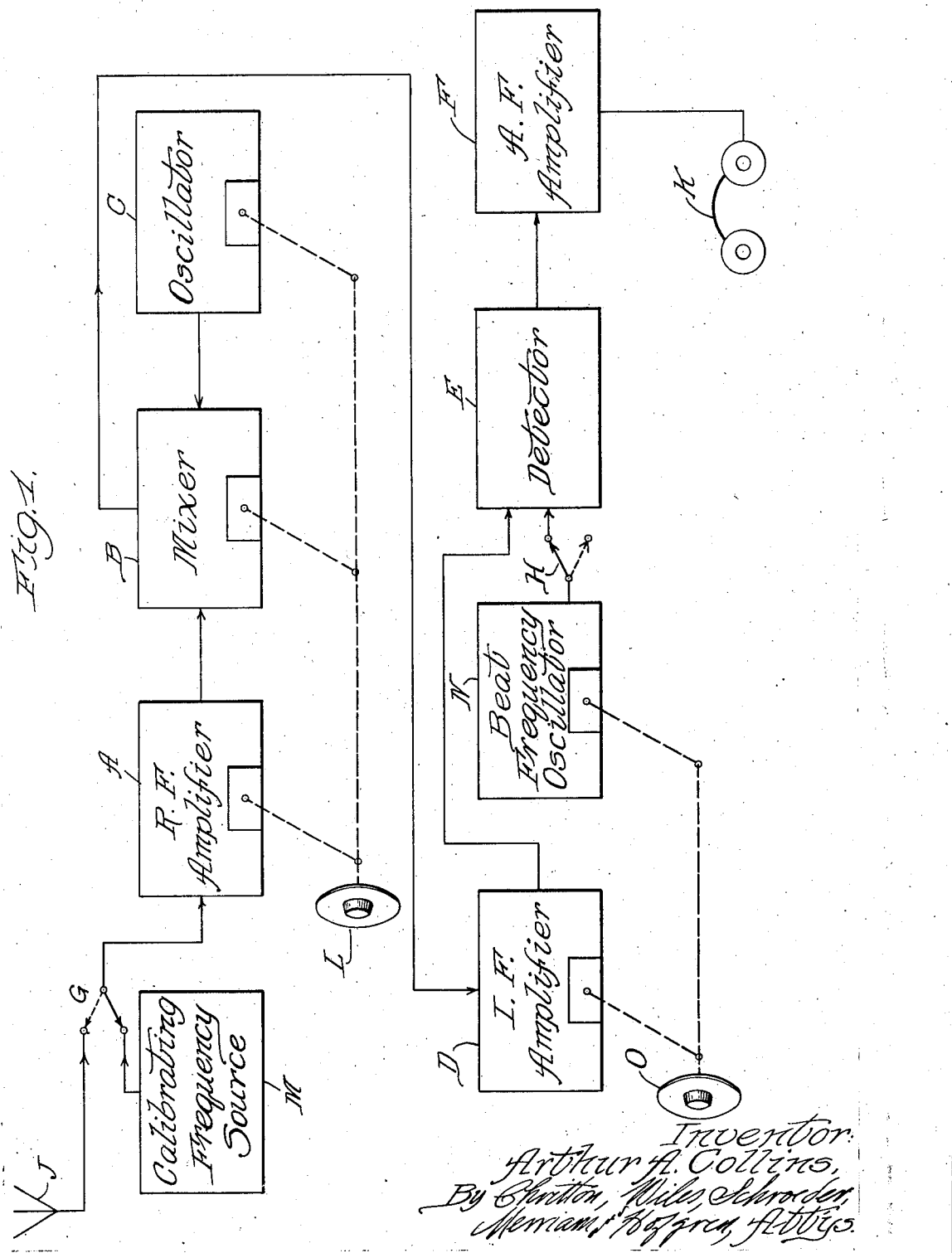

Patented Jan. 29, 1946

2,393,856

UNITED STATES PATENT OFFICE 2,393,856

CALIBRATION SYSTEM FOR RADIO RECEIVERS

Arthur A. Collins, Cedar Rapids, Iowa, assignor to Collins Radio Company, a corporation of Iowa Application October 12, 1944, Serial No. 558,412

8 Claims. (Cl. 250—39)

This invention relates to a calibration system, and more particularly to a system for calibrating the frequency to which radio apparatus is tuned.

One feature of this invention is that it provides means for calibrating or indicating the frequency to which radio apparatus, and more particularly receiving apparatus, is tuned; another feature of this invention is that the calibrating and indicating is effected with a high degree of accuracy even when the receiver is tuned to relatively high frequencies, as those used in aircraft communications; still another feature of this invention is that the calibrating or setting of the receiver to the desired frequency may be done very quickly and easily; and yet another feature of this invention is that the advantages may be obtained without complicated mechanical arrangements or extreme and unusual precision and control of production and assembly of mechanical or electrical parts. Other features and advantages of this invention will be apparent from the following specification and the drawings, in which:

Figure 1 is a block diagram illustrating the principles of my invention; and Figure 2 is a circuit diagram of simple radio receiving aparatus embodying the system of Figure 1.

Under some circumstances, particularly in communication work, it is desirable to be able to tune receiving apparatus to a predetermined frequency on which transmission is to be expected, even though at the time the tuning is done no transmission is taking place and calibrating and indicating means must be used to determine whether the receiver is tuned to the desired channel. It may also be desirable under some conditions to have calibrating and indicating means of sufficient accuracy that the receiving apparatus may readily determine which of two closely adjacent signals is the one it desires to receive; or to use the receiver as a frequency meter. This matter of providing a sufficiently accurate indication of the frequency to which the receiver is tuned is not particularly difficult at low frequencies, as those in the broadcast band. The problem is considerably different, however, in higher frequency bands, particularly where a receiver incorporates a band switching arrangement and the same main tuning dial must function in each of a plurality of different bands. Accurate calibration by use of the main tuning dial under such circumstances requires the dial mechanism and other mechanical parts and the electrical elements of the associated tuned circuits to be held within tolerances which are impossible from a production standpoint. Any attempt to provide a direct reading of the frequency from the main tuning dial, with sufficient accuracy to distinguish between adjacent channels, involves such complexity and cost in receivers designed to operate on a plurality of bands above one megacycle as to make it commercially impractical to produce them.

I have devised and am here disclosing and claiming a calibration or indicating system which obviates the disadvantages mentioned above, which can be readily incorporated in receivers, and which provides a very accurate indication of the frequency to which the receiver is tuned, regardless of the band in which it may be operative. I accomplish this by providing a source of a plurality of calibrating signals of equally spaced fixed frequencies which have been very accurately calibrated; selecting, by means of the main tuning oscillator and radio frequency tuning arrangements, one of these calibrating signals closely adjacent the channel on which it is desired to set the receiver, the action of the main tuning oscillator beating this chosen calibrating signal down to an intermediate frequency. In order to provide an accurate interpolation or exact determination of the frequency I beat this intermediate frequency signal with a calibrating oscillator or beat frequency oscillator variable over a frequency range equal to that between calibrating signals and relatively accurately calibrated, preferably providing a tunable intermediate frequency amplifier and synchronizing variation of the calibrating oscillator with variation of this intermediate frequency amplifier. The result is that the dial or other indicating means associated with the main tuning oscillator need have its indicating means only calibrated with an approximate or reasonable degree of accuracy easily maintained as a production matter; and the more exact interpolation is provided by the relatively low frequency calibrating oscillator working at or near the normal intermediate frequency of the receiver.

In the particular embodiment of this invention illustrated in Figure 1, a receiving system of the superheterodyne type is shown as comprising a radio frequency amplifier portion A, a mixer or first detector B, a main tuning oscillator C, an intermediate frequency amplifier D, a detector or second mixer E, and an audio frequency amplifier F. When the switches G and H are in the dotted line positions, the receiver operates as a conventional superheterodyne receiver, a signal picked up by the antenna J undergoing preliminary selection and amplification in the radio frequency amplifier A, being beat down in the mixer B to a desired intermediate frequency through combination with the frequency delivered by the tuning oscillator C, undergoing additional selection and amplification in the intermediate frequency amplifier D, being demodulated in the detector E, and the resultant audio signal being further amplified in the audio frequency amplifier F and delivered to earphones or other translating means K. The radio frequency amplifier A, mixer B, and main tuning oscillator C are all indicated as being variable, their variable tuned circuits being ganged and synchronously varied by any appropriate manually operable means, as the main tuning dial L. During ordinary reception the intermediate frequency amplifier D, although indicated as variable, would be peaked at a predetermined intermediate frequency sometimes referred to hereafter as the reference frequency.

When it is desired accurately to determine the frequency on which reception is taking place, or to tune the receiver precisely to a desired channel, the switch G is thrown from the position shown in dotted lines to the position shown in full lines, connecting the input of the receiver to a source of a plurality of calibrating signals of equally spaced fixed frequencies, the block representing this source being here identified as M. These frequencies preferably differ by a given frequency which is a very small fraction of the frequencies which the set is designed to receive, and the given frequency is preferably ten-to-an-integral-power cycles. If the receiver is designed to operate in a 2.5 to 3.5 megacycle band, for example, the given frequency would preferably be 100 kilocycles. The source of calibrated frequencies would be so constructed and arranged as to provide calibrating signals at frequencies exactly 100 kilocycles apart, at least in the band between 2.5 and 3.5 megacycles.

The calibrating arrangement also includes a beat frequency or calibrating frequency oscillator N adapted to be connected to or disconnected from the detector E by the switch H. When calibrating or setting is being done the switch H would be in the position shown in solid lines, connecting the oscillator N to the detector to cause it to beat with the intermediate frequency signal delivered from the intermediate frequency amplifier D. The beat frequency or calibrating oscillator is tunable over a frequency range equal to the difference between calibrating frequencies delivered by the source M, and including the intermediate frequency. The intermediate frequency is preferably so chosen that the frequency over which the calibrating oscillator is tunable is a substantial fraction of the intermediate frequency. For example, in connection with the frequencies assumed in the preceding paragraph, the intermediate frequency might well be 500 kilocycles, and the oscillator N tunable over a range of from 450 kilocycles to 550 kilocycles. The provision of this beat frequency or calibrating oscillator, operating at a frequency where relatively accurate calibration of its dial is easily effected, is of prime importance in the practice of my invention. It is a relatively simple production matter to build an oscillator operating through the above-mentioned frequency range at a frequency around 400 to 500 kilocycles with considerable stability and with quite accurate correlation between the scale graduations on its tuning dial and the frequency delivered by the oscillator. With my system of frequency calibration it is this beat frequency or calibrating oscillator dial which provides the accurate indication of the frequency to which the receiver is tuned, the main tuning dial L merely providing an approximate indication which need only be sufficiently accurate to determine which of the calibrating signals spaced 100 kilocycles is being passed through the system. Moreover, extremely accurate setting of the calibrating oscillator N is easily and quickly effected by beating its output against the intermediate frequency signal until zero beat is obtained, my system not depending on relative strength of signal, or the like.

While my system is operable with a fixedly tuned intermediate frequency amplifier having fairly wide band pass characteristics, I prefer to use an intermediate frequency amplifier having its tuned circuits relatively sharply peaked, but tunable or variable over the same frequency range as that covered by the calibrating oscillator. In the particular case assumed above, for example, the tuned circuits of the intermediate frequency amplifier D would preferably pass a band only 5 or 10 kilocycles wide, and would be tunable over the range from 450 to 550 kilocycles. 500 kilocycles would be the normal intermediate frequency of the set, used during reception, this frequency being the reference frequency from which departures are made for accurate calibration. When such departures are made, of course, the system would temporarily have a somewhat different intermediate frequency depending upon the setting of the intermediate frequency amplifier. The tuned circuits of this amplifier D and of the calibrating oscillator N are synchronized and ganged to be varied by a single tuning control, indicated in the drawings as the dial O.

The ease, simplicity and accuracy of this calibration system will be readily apparent from an explanation of the manner in which it is used, and a representative example will be described. Let us assume that we desire to set our receiver to the channel on which a known transmitter will operate in the near future, which may be assumed to be 3,126 kilocycles. Remembering that we have fixed accurate calibrating signals available from the source M at 3,000 kc., 3,100 kc., 3,200 kc., etc., it will be seen that the desired frequency is closest to the 3,100 kilocycle calibrating signal, and that the difficult part of the calibration would, under normal circumstances, be the accurate determination of a point 26 kilocycles above this calibrating signal. In a commercial receiver embodying my invention the calibrating dial O would normally be releasably locked at a central position, the zero or reference position, with the circuits of the intermediate frequency amplifier D and calibrating oscillator N tuned to 500 kilocycles. The first step would be to unlock the dial O (as by applying sufficient force to move a spring-pressed ball out of a cooperating detent) and rotate it in what may be termed a positive direction until the graduations of this dial show that the frequency is 26 kilocycles above the reference frequency, so that the intermediate frequency amplifier D and calibrating oscillator N would then be tuned to 526 kilocycles. The main tuning dial L would then be rotated to a position slightly above the 3,100 kilocycle marking or graduation, and this dial rotated slowly back and forth in the neighborhood of this point until a zero beat was secured between the output of the calibrating oscillator N and the particular fixed calibrating frequency from the source M which reached the detector E. The tuned circuits of the RF amplifier A and mixer B would be sharp enough to provide sufficient elimination, at or near the 3,100 kilocycle position of the tuning dial L, of all calibrating signals other than the desired 3,100 kilocycle signal. When this signal zero beats with the 526 kilocycle calibrating oscillator output, the main tuning oscillator C will be accurately set at a frequency differing by 526 kilocycles from the 3,100 kilocycle calibrating signal, as for example at 3,626 kilocycles. The main tuning dial L would then be left in this position, and the calibrated dial 0 rotated back to the reference position, again setting the tuned circuits of the intermediate frequency amplifier D at 500 kilocycles. If the switches G and H are then thrown to their dotted line positions, the calibrating oscillator N will then be removed from its connection to the system and the input of the receiver will again be connected to the antenna J. Signals reaching this antenna and delivered to the mixer B will then beat against a main tuning oscillator frequency of 3,626 kilocycles; and, since the intermediate frequency amplifier is now peaked to an intermediate frequency of 500 kilocycles, the received signal, the channel to which the receiver is accurately tuned, is 3,126 kilocycles.

While the above representative example is believed sufficient for purposes of understanding of my invention, it will be understood that the arrangement may be used not only for setting the receiver in advance to a desired channel, but also for using the receiver as an accurate wave meter to determine the frequency of any signal within the band range of the receiver. If a given station is being heard, its approximate frequency may be read from the graduations on the main tuning dial L, an exact determination of its frequency being achieved by throwing the switches to the calibrating position and tuning the dial 0 until zero beat is secured between the calibrating oscillator and the particular calibrating signal selected by the tuned circuits in the radio frequency portion of the receiver. In any case, the correlation between the graduations on the main tuning dial L and the frequency to which the receiver is tuned need only be approximate, the accurate interpolation or determination being provided by the graduations on the dial 0. In the example assumed above, for example, the main tuning dial L might have read about 3,115 kilocycles, but the fact that zero beat was effected when the calibrating dial 0 was at plus 26 kilocycles indicated that the true frequency to which the receiver was tuned was 3,126 kilocycles. Moreover, while the system has been described above, and will be shown in circuit form in Figure 2, in connection with a receiver covering only a single band, it will be understood that the system is equally operable and is particularly advantageous in connection with multi-band receivers. The fixed reactance elements in the tuned tank circuits in the main tuning oscillator C and the radio frequency portions of the receiver may be switched to provide the variation between different bands, even though this accentuates the discrepancies between the indications on the main tuning dial L and the true frequency in any particular case. The reactance elements of the tuned circuits controlling the frequency of the calibrating oscillator N do not have to be switched, remain accurately correlated with indications on the dial 0, and provide the accurate calibration desired in any of the bands through which the receiver is tunable.

Figure 2 is a simplified circuit diagram of a radio receiver embodying my invention, the receiver being shown as covering only a single band, although it will be understood that in practice the fixed reactance elements of the tuned tank circuits would be switched to provide coverage of a plurality of bands. The radio frequency amplifier portion A, adapted to be selectively connected either to the antenna or to the calibrating frequency source by operation of the switch G, is here shown as including a tube 10, which may be of the 12SG7 type. The input is through a radio frequency transformer having its secondary coil 11 permeability tuned to provide the variable reactance element of a tuned tank circuit including the fixed condenser 12. While the tuning is here shown as of the variable inductance type, it will be understood that the invention is equally applicable to tank circuits wherein the inductance is the fixed reactance and a variable condenser is used for tuning. While "ganging" or synchronizing of the variable elements in the tuned circuits throughout the diagram has not been specifically indicated thereon, as connecting lines would unduly complicate the circuit diagram, it will be understood that all variable coils are ganged with at least some of the other coils. As was described in connection with the block diagram, the tuned circuits of the radio frequency amplifier, mixer and main tuning oscillator all have their variable elements ganged for operation by the main tuning dial; and the tuned circuits of the intermediate frequency amplifier and the calibrating oscillator have their variable elements ganged for synchronous operation by the calibrating dial.

The output of the radio frequency section of the receiver (which in practice would normally comprise several tubes in cascade, rather than the single tube shown for simplicity of illustration), is coupled to the input of the mixer or first detector tube 13, which may be of the 12SA7 type. This coupling is here shown as effected by a coupling condenser 14 and a pair of coupled tuned coils 15 and 16, these coils having the fixed condensers 17 and 18 in shunt therewith.

Connection to the injection grid of the mixer tube 13 is a lead from the output of the main tuning oscillator of the receiver, here shown as including the tube 19, which may be of the 12SJ7 type. The frequency of this oscillator is controlled by a tank circuit including the variable inductance 20 and the fixed condenser 21. In the particular receiver here being described as a representative example, the tuned circuits in the radio frequency section in the input of the mixer might cover the range of 2.5 to 3.5 megacycles; and the tuned circuit of the main oscillator might be arranged to cover the range of 3 to 4 megacycles, the variation throughout these ranges being coordinated, as heretofore mentioned, so that the beat note output of the mixer tube 13 is 500 kilocycles.

This intermediate frequency mixer output is delivered to the intermediate frequency amplifier section of the receiver, this section being here shown as comprising the single tube 22, which may be of the 12SG7 type, although in practice a plurality of such tubes and associated circuits would normally be arranged in cascade in this section of the receiver. Both the input and output of the intermediate frequency amplifying tube 22 is effected through doubly tuned coupling arrangements. The input coupling arrangement is here shown as including the coupling condenser 23, the coupled tuned coils 24 and 25, and the fixed condensers 26 and 27 in shunt with such coils. The output is through a similar arrangement including the coupling condenser 28, the coupled tuned coils 29 and 30, and the condensers 31 and 32 in shunt therewith.

The output of the intermediate frequency amplifier is delivered to a detector or second mixer here shown as comprising the tube 33, which may be of the 12H6 type. The intermediate frequency signal is delivered to the anodes of this tube, the anodes and cathodes being respectively tied together in this case so that the tube operates as a single rectifier or detector. The output of this tube 33 is delivered to an audio frequency amplifier section which would in practice generally comprise several tubes in cascade, but which is here shown as comprising the single tube 34, which may be of the 12SJ7 type. The amplified audio output is delivered to any appropriate translating device, as the earphones K.

The source of calibrating signals is the circuit section at the lower left-hand corner of the figure, here shown as including the tube 35, which may be of the 12SJ7 type. This tube is arranged to operate as an oscillator at a fixed frequency, as for example 100 kilocycles, determined by the fixedly tuned tank circuit including the coil 36 and the condenser 37. Coupling to a signal grid is effected through a 100 kilocycle crystal 38. The crystal insures oscillation at the desired fundamental frequency of 100 kilocycles; and proper adjustment of the circuit components in known manner provides an output of the oscillator 35 which is rich in harmonics of this fundamental, the 25th to 35th harmonics being used for calibrating purposes in the circuit here being particularly described. In order to prevent undesired interference from the calibrating signals during reception, the tube 35 may be rendered inoperative by operation of the screen grid voltage supply switch 39. Plate supply voltage is delivered to the oscillator 35 through a blocking resistor 40 and radio frequency choke 41, isolating the radio frequency output from direct connection with the remainder of the circuit except through the coupling condenser 42 and switch G to the input of the radio frequency amplifying section.

The calibrating or beat frequency oscillator section N is here shown as comprising a tube 43, which may be of the 12SJ7 type, the frequency generated by this oscillator being determined by a tunable tank circuit including the variable inductance 44 and the fixed condenser 45 in shunt therewith. While the switch H was shown on the block diagram of Figure 1 as direct connected between the beat frequency oscillator and the detector, switching is in practice preferably accomplished electronically by using the switch H to connect the plate of the tube 43 to, or disconnect it from, the source of plate voltage. In the particular receiver being described as representative, the coils 24, 25, 29, 30 and 44 would be ganged for synchronous operation, the reactance elements of the tank circuits thus tuned being so chosen that the intermediate frequency amplifier tuned circuits and the oscillator frequency would synchronously cover a range of from 450 to 550 kilocycles. The center of this range, the 500 kilocycle frequency, would be used as the reference or normal intermediate frequency, with the circuits being tuned to this frequency during normal reception and displaced therefrom only for calibrating purposes.

To cover the frequency ranges specified above, the coils 11, 15 and 16 might be variable from 5.7 to 11.3 microhenrys, and shunted by 360 micromicrofarad condensers 12, 17 and 18; the main tuning oscillator tank circuit inductance 20 might be variable from 5.1 to 9.2 microhenrys, and be shunted by a 310 mmf. condenser 21; the intermediate frequency tuned coils 24, 25, 29 and 30 might be variable from 163 to 240 microhenrys, and be shunted by 520 mmf. condensers; the calibrating oscillator tank circuit coil 44 might be variable from 46 to 68 microhenrys and be shunted by a 1,850 mmf. condenser 45; and the fixedly tuned tank circuit of the harmonic generator or calibrating signal generating oscillator might have a tank circuit with its coil 36 of 1,000 microhenrys and its condenser 37 of 2,500 mmf. capacity.

Other circuit elements associated with the various tubes would be of conventional value for the particular applications and functions of tubes of the types given in each case. For example, in the radio frequency amplifier section, the cathode bias resistor and screen grid resistor might be of 100 and 100,000 ohms, respectively; and the by-passing condensers in each case might have capacities of .01 mf. In the mixer, the input coupling condenser and output coupling condensers 14 and 23 might have capacities of 4 and 10 mmf., respectively; the injection grid might be by-passed to ground through a 20,000 ohm resistor; and the cathode biasing and screen grid resistors might be of 220 and 47,000 ohms, respectively, being by-passed by .01 mf. condensers in each case. In the intermediate frequency amplifying section, the cathode and screen grid resistors might be of 100 and 22,000 ohms, respectively, again being by-passed by .01 mf. condensers in each case. In the detector section, a cathode biasing resistor of 470,000 ohms might be used, by-passed by a 250 mmf. condenser; and the condensers coupling the anodes to the calibrating oscillator, and the cathodes to the audio frequency amplifier, might have capacities of 20 mmf. and .006 mf., respectively. The cathode biasing and control grid resistors in the audio amplifying section might be of 500 and 47,000 ohms, respectively, with the cathode resistor by-passed by a 4 mf. condenser. In the oscillators, the grid of the tube 35 connected to the switch 39 might have a 47,000 ohm resistor in series therewith, by-passed by a .01 mf. condenser, with a 470,000 ohm resistor shunting the crystal 38; in connection with the main tuning oscillator tube 19, a coupling condenser of 100 mmf. and a resistance to ground of 150,000 ohms might be used, with the screen grid having a resistor of 68,000 ohms by-passed by a .01 mf. condenser; and in the calibrating oscillator, the grid leak resistor and condenser might have values of 150,000 ohms and 100 mmf., respectively, with the screen grid having associated therewith a 68,000 ohm resistor by-passed by a .01 mf. condenser.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Radio apparatus of the character described, including: a source of a calibrating signal of fixed frequency; a tuning oscillator adapted to beat said signal down to an intermediate frequency; a calibrating oscillator variable over a relatively limited frequency range including said intermediate frequency and adapted to beat with said intermediate frequency signal; and indicating means for indicating the variation of the frequency of the calibrating oscillator from a predetermined reference frequency.

2. Radio apparatus of the character described, including: a source of a plurality of calibrating signals of equally spaced fixed frequencies; a tuning oscillator adapted to beat a selected one of said signals down to an intermediate frequency; a calibrating oscillator variable over a frequency range equal to that between calibrating signals and including said intermediate frequency and adapted to beat with said intermediate frequency signal; and indicating means for indicating the variation of the frequency of the calibrating oscillator from a predetermined reference frequency.

3. Radio receiving apparatus of the character described, including: radio frequency amplifying means; mixing means, at least one of these means including variable tuning means; a variable tuning oscillator; means for synchronously varying the oscillator and variable means; a source of a plurality of calibrating signals of equally spaced fixed frequencies; means for supplying said signals to the amplifier and mixer, whereby the oscillator beats a selected one of said signals down to an intermediate frequency; a calibrating oscillator variable over a frequency range equal to that between calibrating signals and including said intermedite frequency and adapted to beat with said intermediate frequency signal; and indicating means for indicating the variation of the frequency of the calibrating oscillator from a predetermined reference frequency.

4. Radio receiving apparatus of the character described, including: radio frequency amplifying means; mixing means, at least one of these means including variable tuning means; a variable tuning oscillator; means for synchronously varying the oscillator and variable means; a source of a plurality of calibrating signals of equally spaced fixed frequencies; means for supplying said signals to the amplifier and mixer, whereby the oscillator beats a selected one of said signals down to an intermediate frequency; an intermediate frequency amplifier having tuning means variable over a frequency range equal to that between calibrating signals and including said intermediate frequency; a calibrating oscillator varible over a frequency range equal to that between calibrating signals and adapted to beat with the amplified intermediate frequency signal; means for synchronously varying the intermediate frequency amplifier and calibrating oscillator; and indicating means for indicating the variation of the frequency of the calibrating oscillator from a predetermined reference frequency.

5. Radio receiving apparatus of the character described, including: radio frequency amplifying means; mixing means, at least one of these means including variable tuning means; a variable tuning oscillator; means for synchronously varying the oscillator and variable means; a source of a plurality of calibrating signals of equally spaced fixed frequencies, the spacing between frequencies being only a small fraction of such frequencies; means for supplying said signals to the amplifier and mixer, whereby the oscillator beats a selected one of said signals down to an intermediate frequency; indicating means associated with said synchronously varying means for approximately indicating the frequency to which the receiving apparatus is tuned; an intermediate frequency amplifier having tuning means variable over a frequency range equal to that between calibrating signals and including said intermediate frequency; a calibrating oscillator variable over a frequency range equal to that between calibrating signals and adapted to beat with the amplified intermediate frequency signal; means for synchronously varying the intermediate frequency amplifier and calibrating oscillator; and indicating means for indicating the variation of the frequency of the calibrating oscillator from a predetermined reference frequency.

6. Radio receiving apparatus of the character described, including: variable radio frequency amplifying means; a variable first mixer connected thereto; a variable tuning oscillator connected to said mixer; means for synchronously varying the amplifier, mixer, and oscillator; a source of a plurality of calibrating signals of equally spaced fixed frequencies, the spacing between frequencies being only a small fraction of such frequencies; means for supplying said signals to the amplifier and mixer, whereby the oscillator beats a selected one of said signals down to an intermediate frequency; indicating means associated with said synchronously varying means for approximately indicating the frequency to which the receiving apparatus is tuned; an intermediate frequency amplifier having tuning means variable over a frequency range equal to that between calibrating signals and including said intermediate frequency; a calibrating oscillator variable over a frequency range equal to that between calibrating signals and adapted to beat with the amplified intermediate frequency signal; means for synchronously varying the intermediate frequency amplifier and calibrating oscillator; a second mixer connected to the intermediate frequency amplifier and calibrating oscillator; and indicating means for indicating the variation of the frequency of the calibrating oscillator from a predetermined reference frequency.

7. Radio apparatus of the character described, including: a source of a plurality of calibrating signals of equally spaced fixed frequencies differing by a given frequency of ten-to-an-integral-power cycles; a tuning oscillator adapted to beat a selected one of said signals down to an intermediate frequency; a calibrating oscillator variable over a frequency range equal to that between calibrating signals and including said intermediate frequency and adapted to beat with said intermediate frequency signal; and indicating means for indicating the variation of the frequency of the calibrating oscillator from a predetermined reference frequency.

8. Radio receiving apparatus of the character described, including: variable radio frequency amplifying means; a variable first mixer connected thereto; a variable tuning oscillator connected to said mixer; means for synchronously varying the amplifier, mixer, and oscillator; a source of a plurality of calibrating signals of equally spaced fixed frequencies, the spacing between frequencies being only a small fraction of such frequencies and differing by a given frequency of ten-to-an-integral-power cycles; means for supplying said signals to the amplifier and mixer, whereby the oscillator beats a selected one of said signals down to the intermediate frequency; indicating means associated with said synchronously varying means for approximately indicating the frequency to which the receiving apparatus is tuned; an intermediate frequency amplifier having tuning means variable over a frequency range equal to that between calibrating signals and including said intermediate frequency; a calibrating oscillator variable over a frequency range equal to that between calibrating signals and adapted to beat with the amplified intermediate frequency signal; means for synchronously varying the intermediate frequency amplifier and calibrating oscillator; a second mixer connected to the intermediate frequency amplifier and calibrating oscillator; and indicating means for indicating the variation of the frequency of the calibrating oscillator from a predetermined reference frequency.

ARTHUR A. COLLINS.